(12) United States Patent
Shen

(10) Patent No.: US 8,077,450 B2
(45) Date of Patent: Dec. 13, 2011

(54) COLLAPSIBLE DEVICE

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 133 days.

(21) Appl. No.: 12/641,332

(22) Filed: Dec. 18, 2009

(65) Prior Publication Data

US 2011/0127894 A1    Jun. 2, 2011

(30) Foreign Application Priority Data

Nov. 30, 2009   (CN) ............... 2009 2 0316177 U

(51) Int. Cl.
G06F 1/16 (2006.01)
H05K 7/00 (2006.01)
H05K 5/00 (2006.01)

(52) U.S. Cl. .................. 361/679.3; 455/575.4

(58) Field of Classification Search ............ 361/679.21, 361/679.26–679.3; 455/575.1–575.4, 575.8
See application file for complete search history.

(56) References Cited

U.S. PATENT DOCUMENTS

| | | | |
|---|---|---|---|
| 2007/0105606 A1* | 5/2007 | Yoon et al. ............. | 455/575.4 |
| 2008/0081505 A1* | 4/2008 | Ou et al. ............... | 439/374 |
| 2009/0016002 A1* | 1/2009 | Lai et al. ............... | 361/681 |
| 2009/0233659 A1* | 9/2009 | Ke et al. ............... | 455/575.3 |
| 2009/0325656 A1* | 12/2009 | Tang .................... | 455/575.4 |
| 2010/0016042 A1* | 1/2010 | Shim et al. ............ | 455/575.4 |

\* cited by examiner

Primary Examiner — Jinhee Lee
Assistant Examiner — Adrian S Wilson
(74) Attorney, Agent, or Firm — Altis Law Group, Inc.

(57) ABSTRACT

A collapsible device includes a cover, a base, a connecting member pivotally mounted to the base, and two slide units. Each slide unit includes a fixing member fixed to the cover, and a receiving member fixed to the connecting member. The receiving member is received in the fixing member, and slidable relative to the fixing member.

16 Claims, 8 Drawing Sheets

COLLAPSIBLE DEVICE

BACKGROUND

1. Technical Field

The disclosure relates to a collapsible device.

2. Description of Related Art

A collapsible device, such as a notebook computer, or a clamshell mobile phone, generally including a main body and a cover, often employs a hinge to interconnect the main body and the cover. The hinge allows the cover to be rotatable with respect to the main body, and collapsed with the main body for saving space. However, sufficient space for rotating the cover relative to the base is necessary, or the collapsible device cannot be opened, which represents inconvenience.

DETAILED DESCRIPTION

Figure 1:
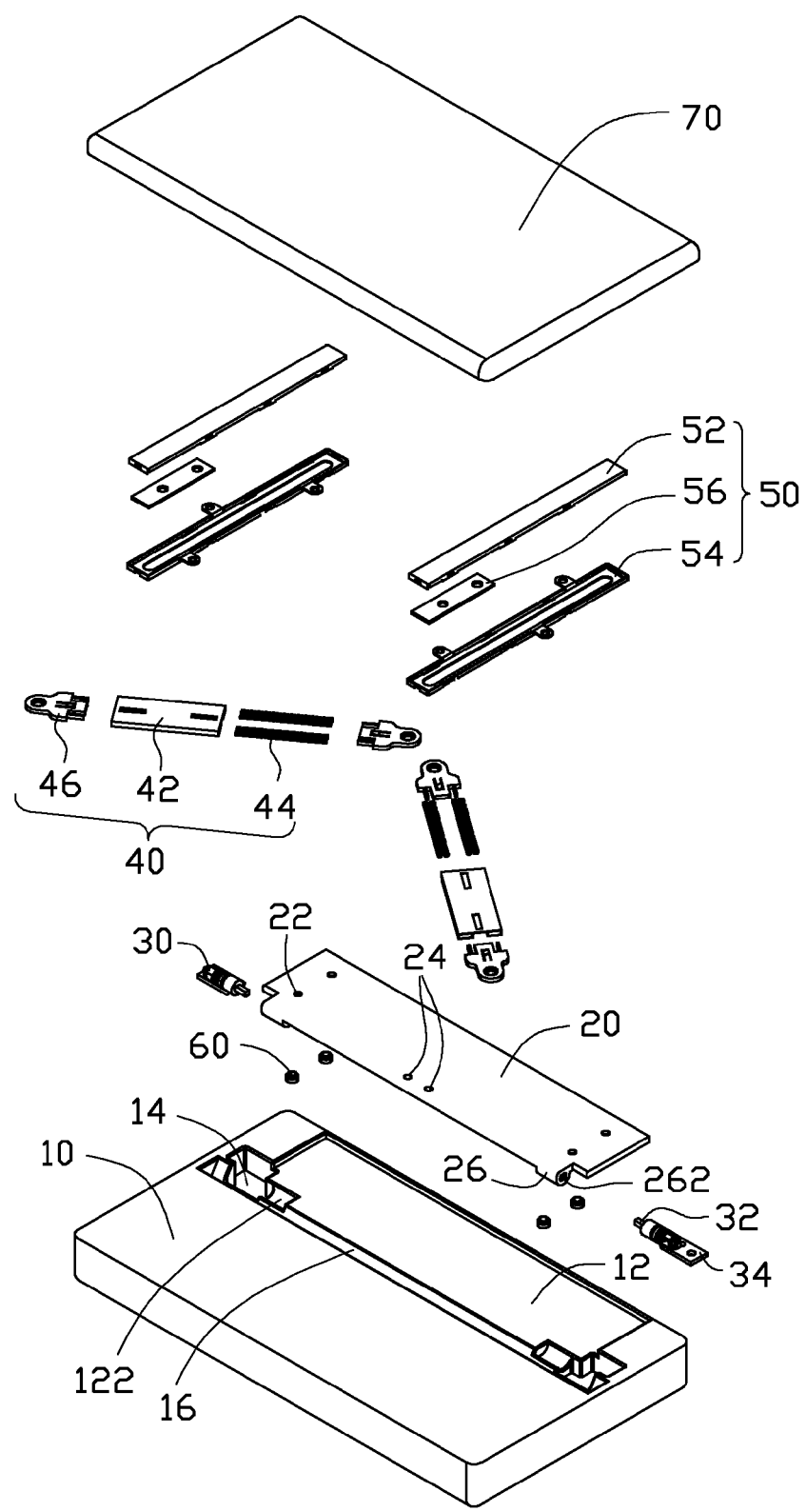
FIG. 1 is an exploded, isometric view of an exemplary embodiment of a collapsible device, the collapsible device including a base, a cover movably mounted to the base, two resilient members, and two slide units.

Referring to FIG. 1, an exemplary embodiment of a collapsible device includes a base 10, a connecting member 20 pivotally mounted to the base 10, two hinges 30, two resilient members 40, two slide units 50, a plurality of fasteners 60, and a cover 70. In this embodiment, the fasteners 60 are screws.

The base 10 defines a depressed portion 12 in a rear side of a top of the base 10, two receiving grooves 14 in opposite ends of the depressed portion 12, and a connecting groove 16 in a front side of the depressed portion 12. The connecting groove 16 is connected between and communicates with the two receiving grooves 14. The depressed portion 12 defines two fixing notches 122 in opposite ends of the depressed portion 12. Each fixing notch 122 communicates with a corresponding receiving groove 14. Obviously, an operating element (not shown), such as a keyboard, and/or operating control can be positioned on a front side of the top of the base 10.

The connecting member 20 is longitudinally planar. Two fixing protrusions 26 each defining a matching hole 262 protrude from opposite ends of a front side of the connecting member 20. A plurality of fixing holes 22 are defined in the opposite ends of the connecting member 20. Two mounting holes 24 are defined in the front side of the connecting member 20, between the fixing protrusions 26.

Each hinge 30 includes a first connecting portion 32, and a second connecting portion 34 rotatable relative to the first connecting portion 32.

Figure 2:
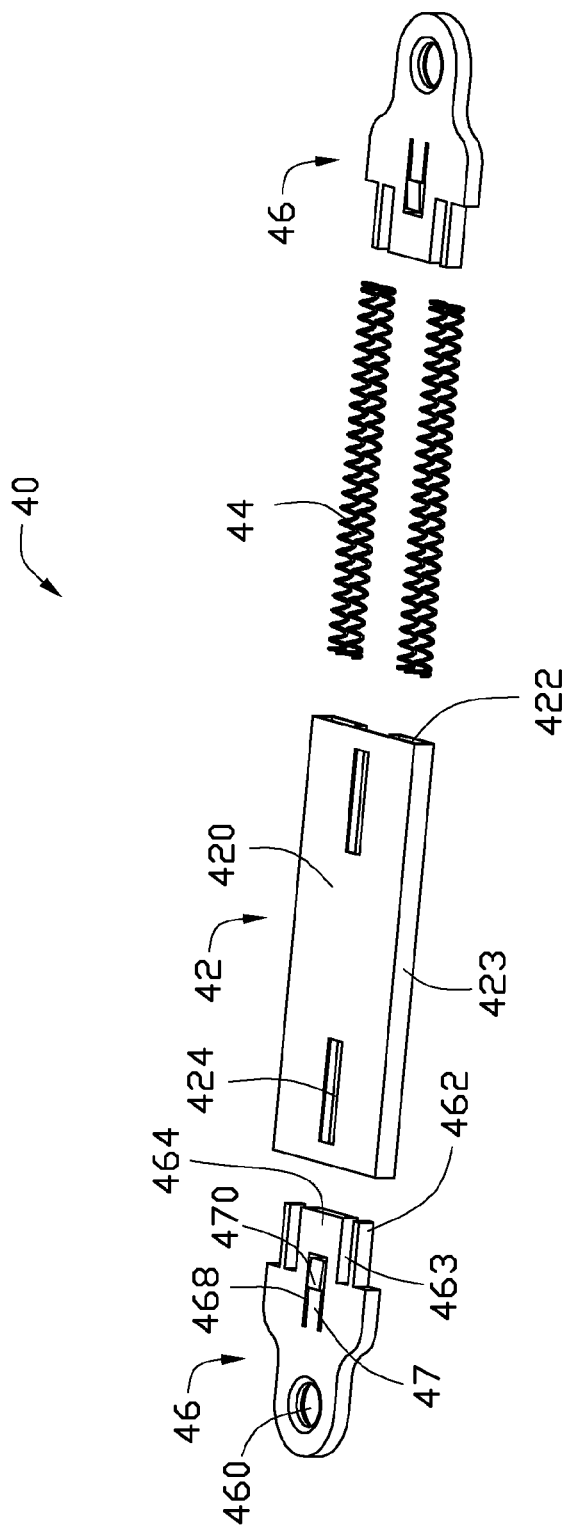
FIG. 2 is an enlarged, isometric view of one of the resilient members of FIG. 1.
Figure 4:
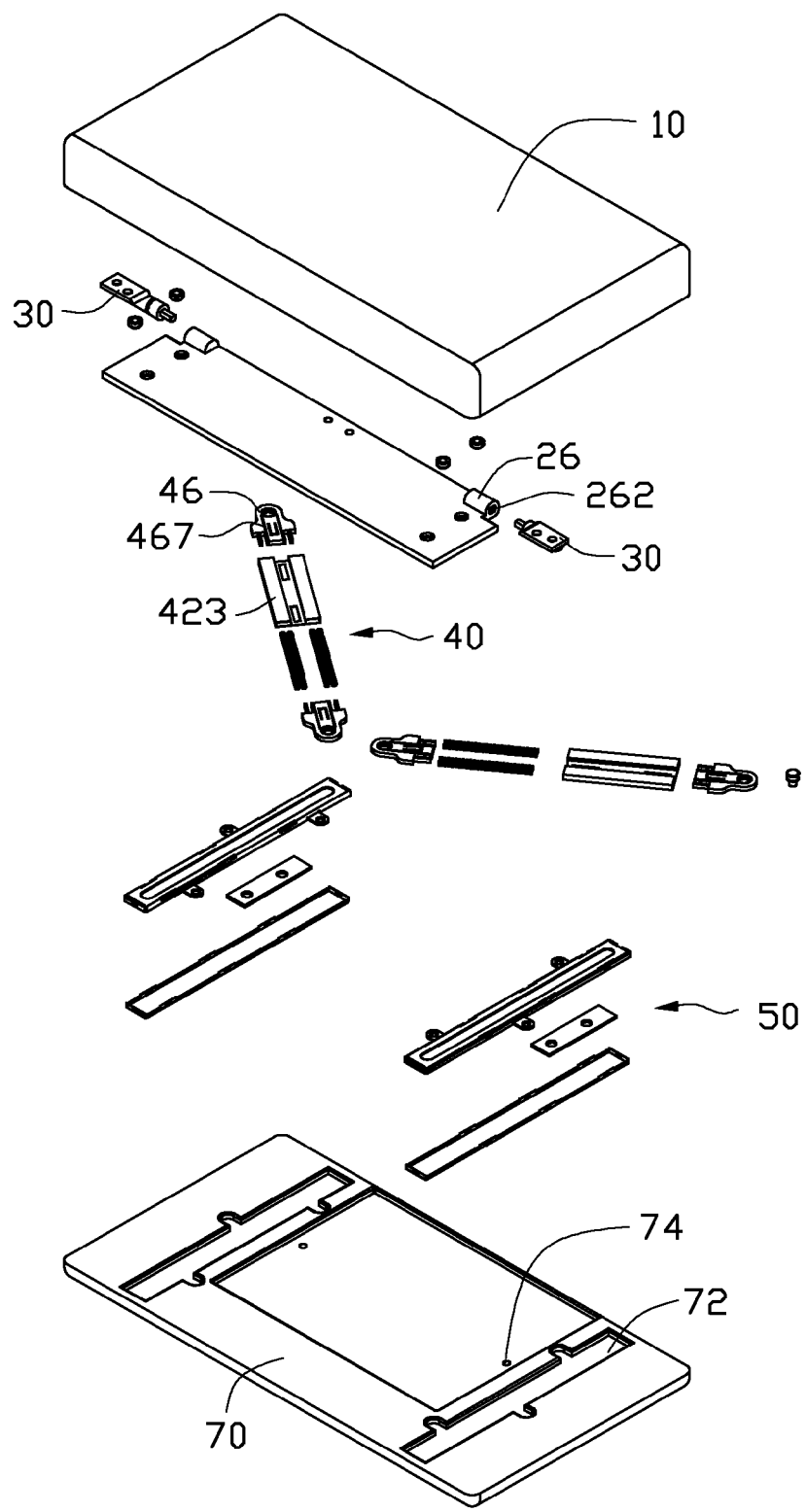
FIG. 4 is an inverted view of FIG. 1.

Referring to FIGS. 2 and 4, each resilient member 40 includes a holding portion 42, two pairs of springs 44 received in the holding portion 41, and two fitting portions 46 slidably mounted to opposite ends of the holding portion 42, correspondingly.

The holding portion 42 includes a top plate 420 and two generally U-shaped flanges 423 extending down from opposite sides of the top plate 420, respectively. Two slide grooves 422 are bounded by the flanges 423, respectively, and located under the top plate 420. The slide grooves 422 are spaced from each other. The top plate 420 defines two clamping slots 424 aligned with each other, between the slide grooves 422.

Each fitting portion 46 defines a fastening hole 460 in a first end of the fitting portion 46. A first received post 464 and two second received posts 462 at opposite sides of the first received post 464 extend from a second end of the fitting portion 46, opposite to the first end of the fitting portion 46. The first received post 464 and the second received posts 462 are separated, so that two cutouts 463 are formed at opposite sides of each second received post 462 o receive ends of the corresponding pair of springs 44. Two clamping channels 467 are defined in a bottom of each fitting portion 46, extending through the first and second ends of the fitting portion 46. Distal sides of the flanges 423 of the holding portion 42 slidably engage in the clamping channels 467, respectively. A U-shaped through groove 468 is defined in each fitting portion 46, between the clamping channels 467. An elastic tongue 47 is formed in the through groove 468. A hook 470 protrudes from a distal end of a top of the tongue 47.

During assembly of each resilient member 40, each pair of springs 44 is received in a corresponding slide groove 422 of the holding portion 42. The fitting portions 46 are mounted to opposite ends of the holding portion 42, with the first received posts 464 of the fitting portions 46 located between the flanges 423 of the holding portion 42, and the second received posts 462 of the fitting portions 46 received in the slide grooves 422, correspondingly. Therefore, opposite ends of each pair of springs 44 are received in the cutouts 463 of the fitting portions 46, correspondingly. The hooks 470 of the fitting portions 46 are slidably engaged in the clamping slots 424 of the holding portion 42, respectively. When the fitting portions 46 are moved towards each other and deform the springs 44, along the distal sides of the flanges 423, the hooks 470 are slid in the clamping slots 424, and can be hooked with edges bounding the clamping slots 424, correspondingly.

Figure 3:
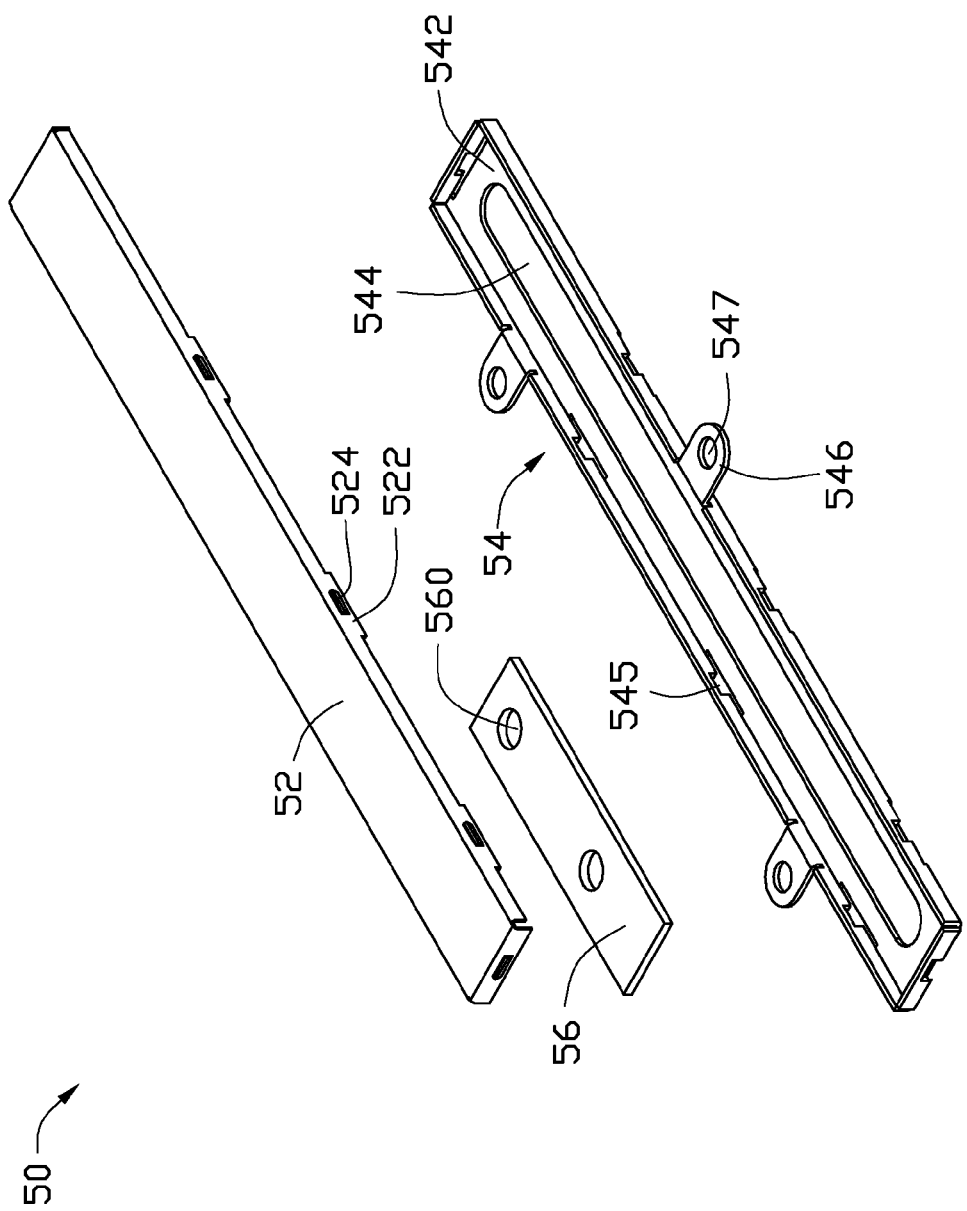
FIG. 3 is an enlarged, isometric view of one of the slide units of FIG. 1.

Referring to FIGS. 3 and 4, each slide unit 50 includes a locking member 52, a fixing member 54, and a receiving member 56 defining two fixing holes 560. The locking member 52 includes four sidewalls (not labeled) perpendicularly extending down from sides of the locking member 52. A plurality of elastic locking tabs 522 extend from the sidewalls. A protrusion 524 extends from each locking tab 522. The fixing member 54 defines a receiving groove 542 in a top of the fixing member 54, to slidably receive the receiving member 56. A bottom of the receiving groove 542 defines a slide slot 544 extending through a bottom of the fixing member 54, with the fixing holes 560 aligned with the slide slot 544. A plurality of fixing blocks 546 perpendicularly extend out of the receiving groove 542 from opposite sidewalls bounding the receiving groove 542, and each fixing block 546 defines a fixing hole 547. The bottom of the receiving groove 542 defines a plurality of clamping slots 545, besides the slide slot 544 and adjacent to the sidewalls bounding the receiving groove 542, correspondingly.

In another embodiment, the locking member 52 and the clamping slots 545 can be omitted.

The cover 70 defines two mounting grooves 72 in opposite ends of a bottom of the cover 70, correspondingly. The shape of each groove 72 corresponds to the fixing member 54 of a corresponding slide unit 50. Two fixing holes 74 are defined in the cover 70, adjacent to the mounting grooves 72 correspondingly. Obviously, a display screen (not shown) may be mounted to a top of the cover 70, opposite to the mounting grooves 72.

Figure 5:
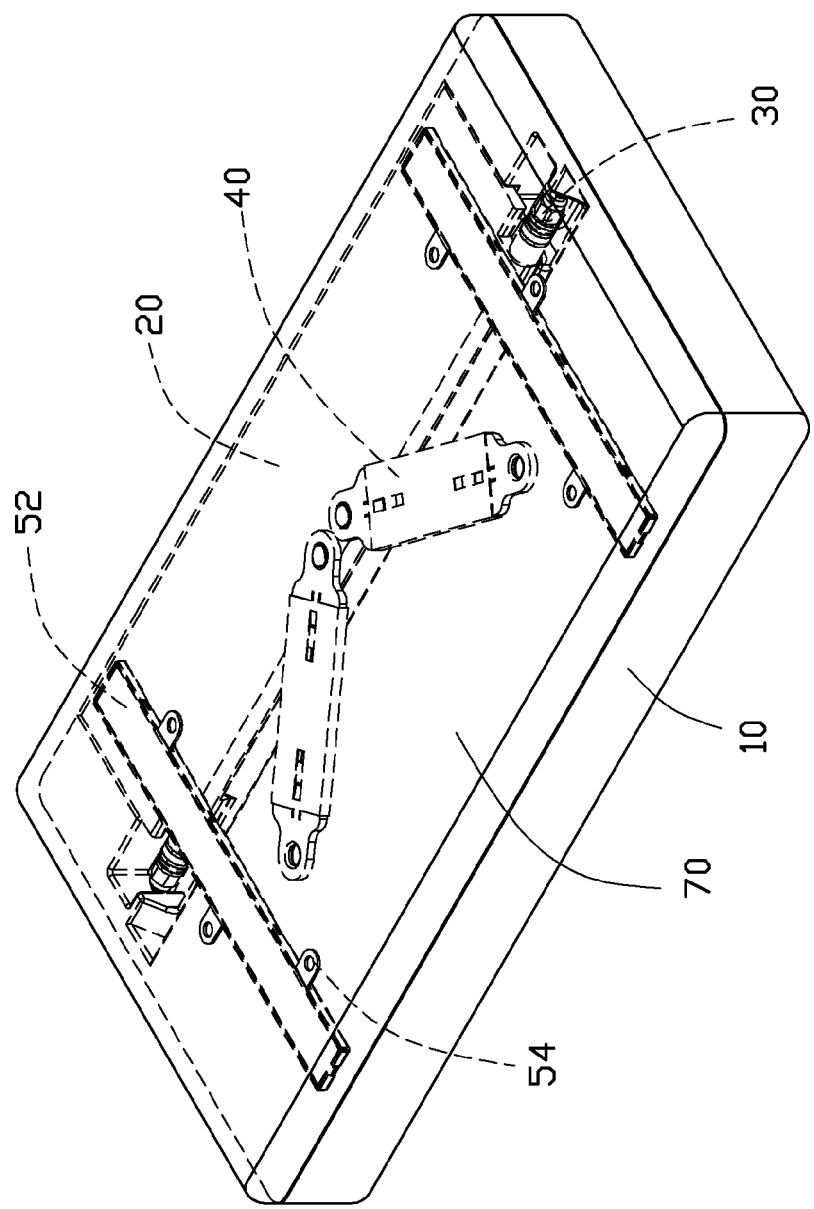
FIG. 5 is an assembled, isometric view of the collapsible device of FIG. 1.

Referring to FIG. 5, in assembling the collapsible device, the second connecting portions 34 of the hinges 30 are fixed to the receiving grooves 14 of the base 10 via screws (not shown), correspondingly. The first connecting portions 34 of the hinges 30 are fixedly engaged in the matching holes 262 of the connecting member 20, correspondingly. Therefore, the connecting members 20 are hinged to the base 10 via the hinges 30. The fixing protrusions 26 of the connecting member 20 are accommodated in the fixing notches 122 of the base 10, correspondingly.

The plurality of fasteners 60 are passed through the plurality of fixing holes 22 of the connecting member 20 and the slide slots 544 of the slide units 50 in that order, and then screwed into the fixing holes 560 of the receiving members 56 slidably received in the receiving grooves 542 of the fixing members 54, correspondingly. The locking members 52 cover the receiving grooves 542 of the fixing members 54, with the protrusions 524 of the locking tabs 522 of the locking members 52 locked in the clamping slots 545 of the fixing members 54, correspondingly. The fixing members 54 are engaged in the mounting grooves 72 of the cover 70, and then a plurality of screws (not shown) are passed through the fixing holes 547 of the fixing members 54 to engage with the cover 70, correspondingly. Therefore, the fixing members 54 are fixed to the cover 70, with the locking members 52 resisting against the cover 70. A screw (not shown) is passed through the fastening hole 460 of one of the fitting portions 46 of each resilient member 40, and then screwed into a corresponding fixing hole 74 of the cover 70, correspondingly. Similarly, a screw (not shown) is passed through the fastening hole 460 of the other fitting portion 46 of each resilient member 40, and then screwed into a corresponding mounting hole 24 of the connecting member 20, correspondingly. Therefore, the resilient members 40 are fixed between the cover 70 and the connecting member 20, and cannot cross with each other. After fully assembly, the connecting member 20 is rotatably received in the depressed portion 12 of the base 10.

Figure 6:
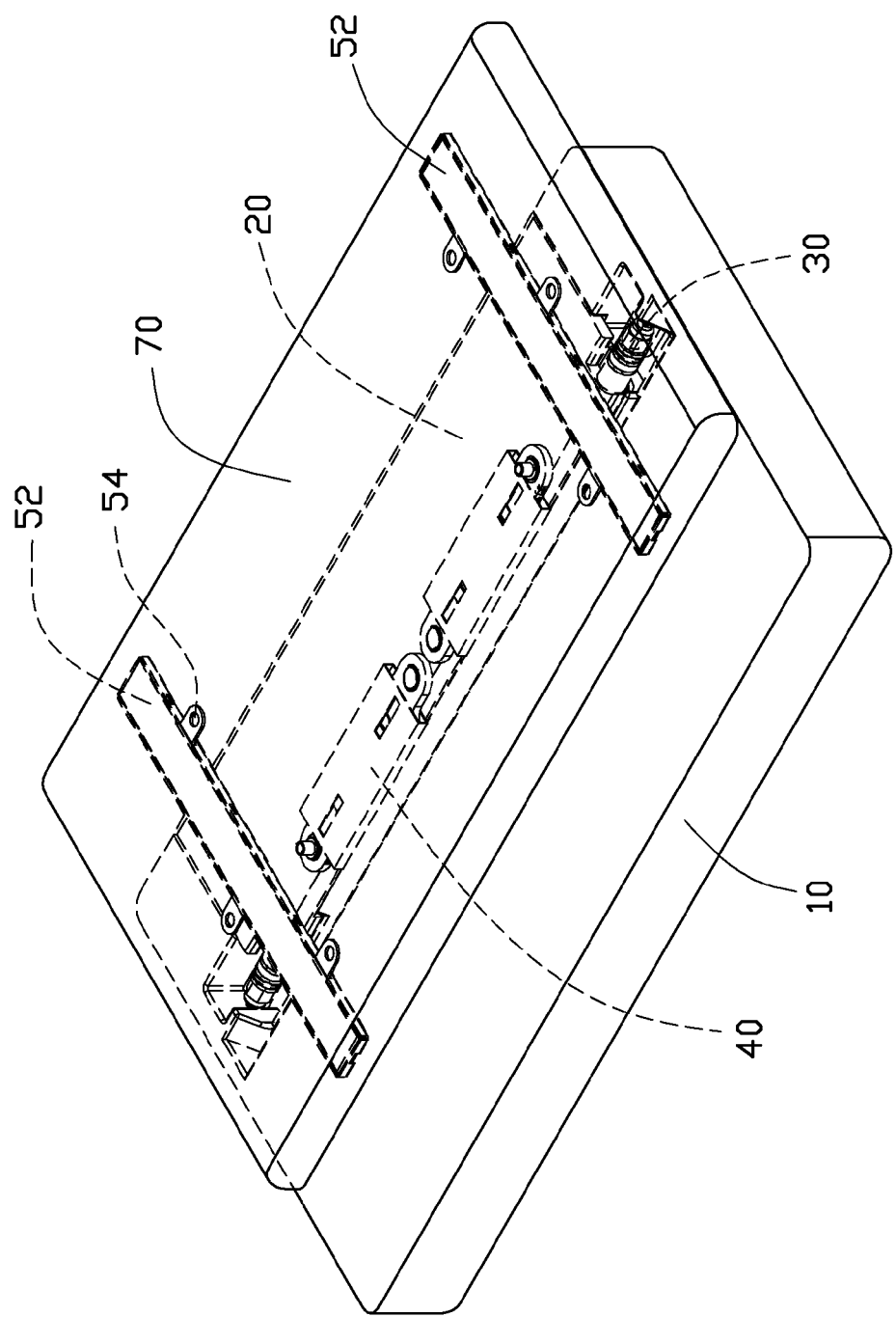
FIGS. 6 to 8 are similar to FIG. 5, but show the cover moving a distance or rotating relative to the base.
Figure 7:
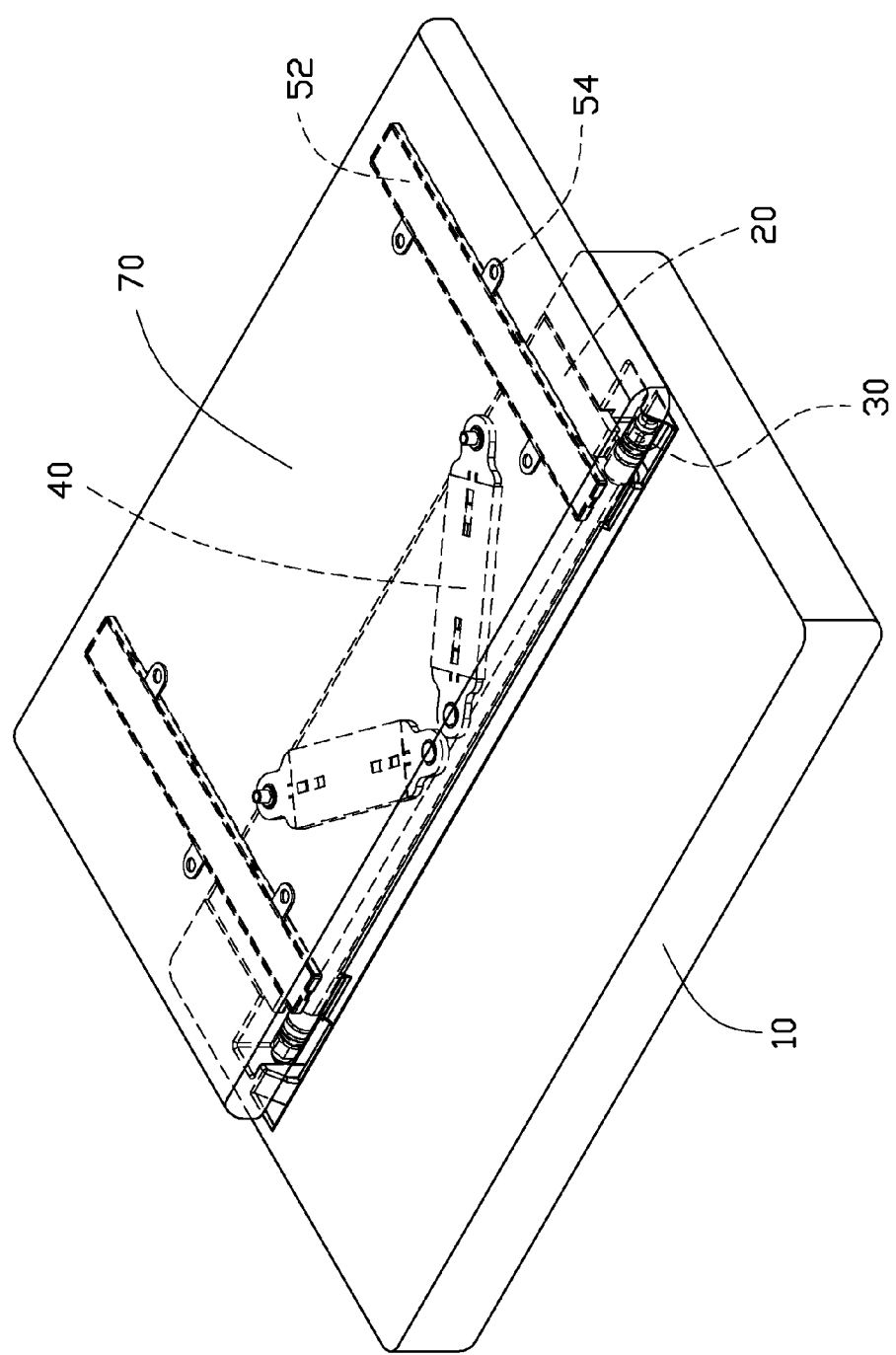
Figure 8:
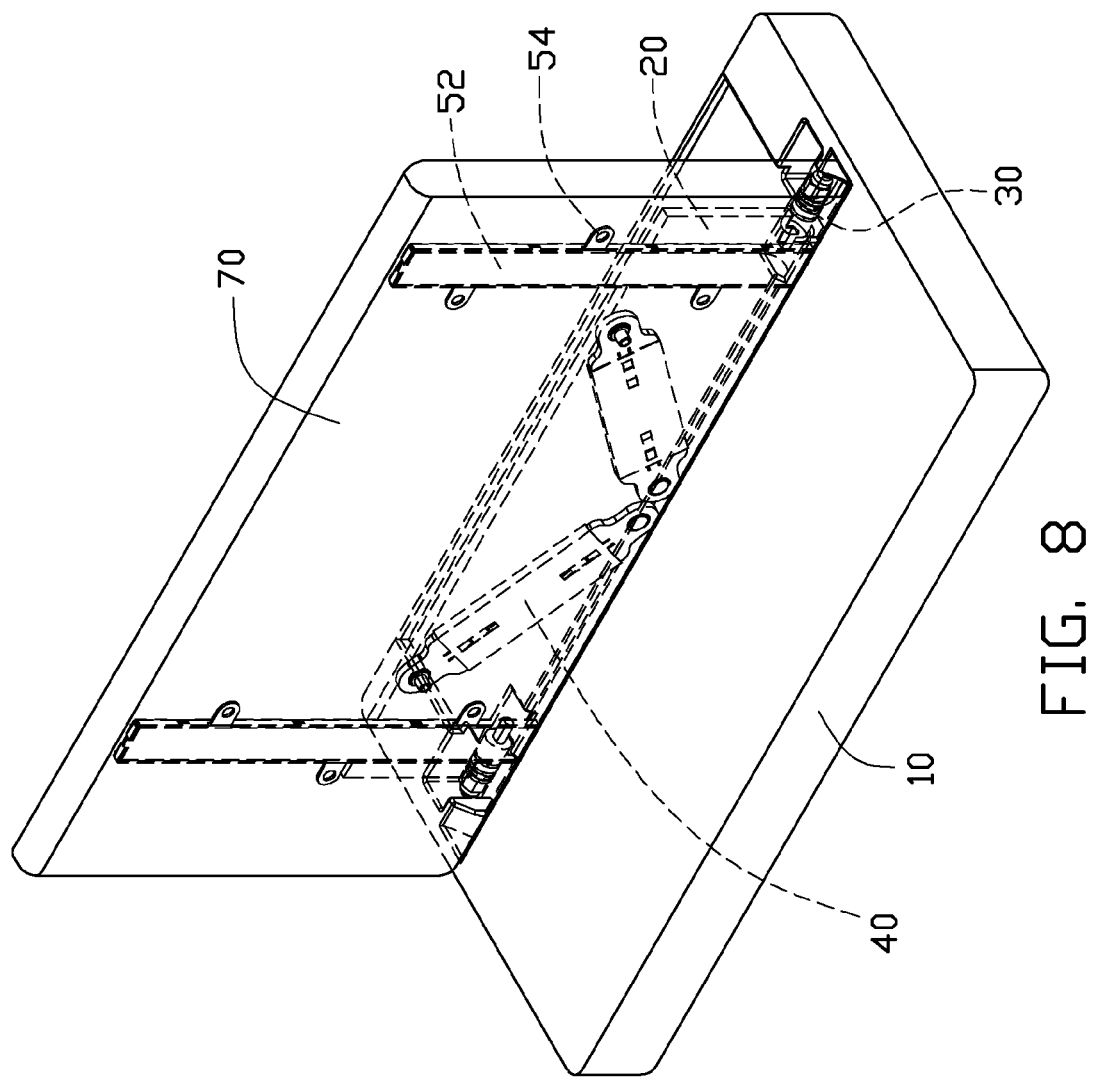

Referring to FIGS. 6 to 8, in use, when the cover 70 is slid rearward on the base 10 from a first position shown in FIG. 5 to a second position shown in FIG. 6, together with the fixing members 54, one of the fitting portions 46 of each resilient member 40 is moved with the cover 70 to deform the springs 44 of the corresponding resilient member 40. In this process, the receiving members 56 of the slide units 50 are slid relative to the fixing members 54 in the corresponding receiving grooves 542 of the fixing members 54 of the slide units 50. The cover 70 needs much more force to slide because of the elasticity of the springs 44. As a result, the cover 70 cannot be started to open unless enough force is used. Correspondingly, the cover 70 needs much more force to start to close because of the elasticity of the springs 44. When the resilient members 40 are aligned in a line, the springs 44 fully distort. The cover 70 is further slid rearward to a third position shown in FIG. 7, together with the springs 44 returning to normal, such that the elasticity of the springs 44 force the cover 70 to slide lightly. When the receiving members 56 resist against ends of the receiving grooves 542, the cover 70 cannot slide further. At this time, the operating element set at the base 10 is exposed, and then, the collapsible device can be operated via the operating element.

In addition, when the cover 70 cannot slide further, the front side of the cover 70 is aligned with the connecting groove 16 of the base 10. The cover 70 is rotated about the hinges 30 relative to the base 10, together with the connecting member 20, to provide another position for operating the collapsible device. In this process, the first connecting portions 32 of the hinges 30 are rotated relative to the second connecting portion 32, so that, the cover 70 may remain at any angle with respect to the base 10 via the hinges 30.

It is believed that the present embodiment and its advantages will be understood from the foregoing description, and it will be apparent that various changes may be made thereto without departing from the spirit and scope of the description or sacrificing all of its material advantages, the example hereinbefore described merely being exemplary embodiment.

What is claimed is:

1. A collapsible device comprising:
   a cover;
   a base;
   a connecting member pivotally mounted to the base; and
   two slide units each comprising a fixing member fixed to the cover, and a receiving member fixed to the connecting member; wherein the receiving member is received in the fixing member, and slidable relative to the fixing member;
   wherein the connecting member defines a plurality of fixing holes, each fixing member defines a receiving groove to receive the receiving member, and a slide slot communicating with the receiving groove, a plurality of fasteners are passed through the slide slots and screwed into the plurality of fixing holes, respectively; each slide unit further comprises a locking member comprising a plurality of locking tabs, from each of which a protrusion extends, and the bottom of the receiving groove defines a plurality of clamping slots; the locking member covers the receiving groove, with the protrusions of the plurality of locking tabs engaging in the plurality of clamping slots.

2. The collapsible device of claim 1, further comprising two resilient members, opposite ends of which are mounted to the connecting member and the cover, and the resilient members are non-crossed with each other.

3. The collapsible device of claim 2, wherein each resilient member comprises a holding portion in which at least one spring is received, and two fitting portions slidably mounted to opposite ends of the holding portion and movable towards each other to deform the at least one spring.

4. The collapsible device of claim 3, wherein the holding portion defines two clamping slots, a hook protrudes from each fitting portion, to slidably engage in a corresponding clamping slot.

5. The collapsible device of claim 1, wherein the cover defines two mounting grooves, the shapes of which correspond to a corresponding fixing member, and into which the fixing members are received, respectively.

6. The collapsible device of claim 5, wherein a plurality of fixing blocks extend outwards from sidewalls bounding the receiving groove, and each fixing block defines a fixing hole via which the fixing blocks are fixed to the cover.

7. The collapsible device of claim 1, further comprising two hinges, each comprising a first connecting portion fixedly mounted to the connecting member, and a second connecting portion rotated relative to the first connecting portion, wherein the second connecting portion is fixed to the base.

8. The collapsible device of claim 7, wherein the base defines a depressed portion to receive the connecting member, and two receiving grooves at opposite ends of the depressed portion in which the hinges are received, with the connecting portions of the hinges fixed in the receiving grooves of the base.

9. A collapsible device comprising:
a cover;
a base;
a connecting member pivotally mounted to the base;
two slide units each comprising a fixing member fixed to the cover, and a receiving member fixed to the connecting member; the receiving member slidably received in the fixing member; and
two resilient members, wherein opposite ends of each resilient member are mounted to the connecting member and the cover, and the resilient members are non-crossed with each other;
wherein the connecting member defines a plurality of fixing holes, each fixing member defines a receiving groove to receive the receiving member, and a slide slot communicating with the receiving groove, a plurality of fasteners are passed through the slide slots and screwed into the plurality of fixing holes, respectively; each slide unit further comprises a locking member comprising a plurality of locking tabs, from each of which a protrusion extends, and the bottom of the receiving groove defines a plurality of clamping slots, the locking member covers the receiving groove, with the protrusions of the plurality of locking tabs engaging in the plurality of clamping slots; and
wherein during rearward movement of the cover relative to the base, together with the fixing members, the receiving member is slid relative to the fixing member and the resilient members are deformed, after the resilient members move to align in a line, the resilient members return to normal, when the cover cannot slide further, the cover can be rotated relative to the base, together with the connecting member.

10. The collapsible device of claim 9, wherein each resilient member comprises a holding portion, two pairs of springs received in the holding portion, and two fitting portions slidably mounted to opposite ends of the holding portion, the fitting portions are movable towards each other to deform the springs.

11. The collapsible device of claim 10, wherein a first received post and two second received posts at opposite sides of the first post extend from each fitting portion, two cutouts are formed at opposite sides of each second received post, to receive ends of the springs, correspondingly.

12. The collapsible device of claim 11, wherein the holding portion comprises a top plate, with two slide grooves defined in opposite ends of a bottom of the top plate, the two pairs of springs and the second received posts are received in the slide grooves, correspondingly, and the first received posts are located between the slide grooves.

13. The collapsible device of claim 12, wherein the top plate defines two clamping slots between the slide grooves, a hook protrudes from each fitting portion, to slidably engage in to a corresponding clamping slot.

14. The collapsible device of claim 9, wherein the cover defines two mounting grooves, the shapes of which correspond to a corresponding fixing member, and to which the fixing members are fixed, respectively.

15. The collapsible device of claim 9, further comprising two hinges, wherein each hinge comprises a first connecting portion fixedly mounted to the connecting member, and a second connecting portion rotated relative to the first connecting portion, the second connecting portion is fixed to the base.

16. The collapsible device of claim 15, wherein the base defines a depressed portion to receive the connecting member, and two receiving grooves in opposite ends of the depressed portion, the hinges are received in the receiving grooves of the base, with the connecting portions of the hinges fixed in the receiving grooves of the base.

* * * * *